No. 897,302.
PATENTED SEPT. 1, 1908.
C. OLSON.
ANIMAL TRAP.
APPLICATION FILED JAN. 24, 1908.
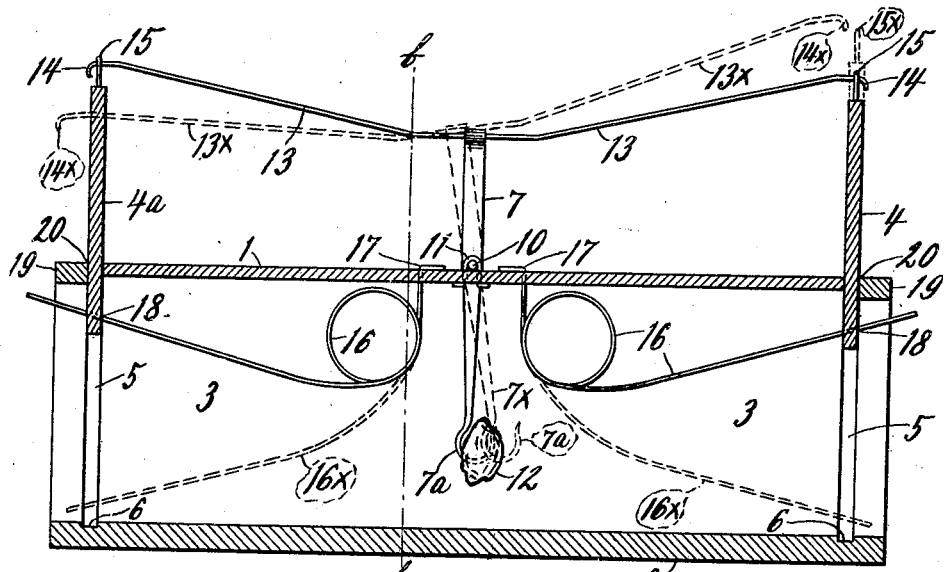
FIG. 1.
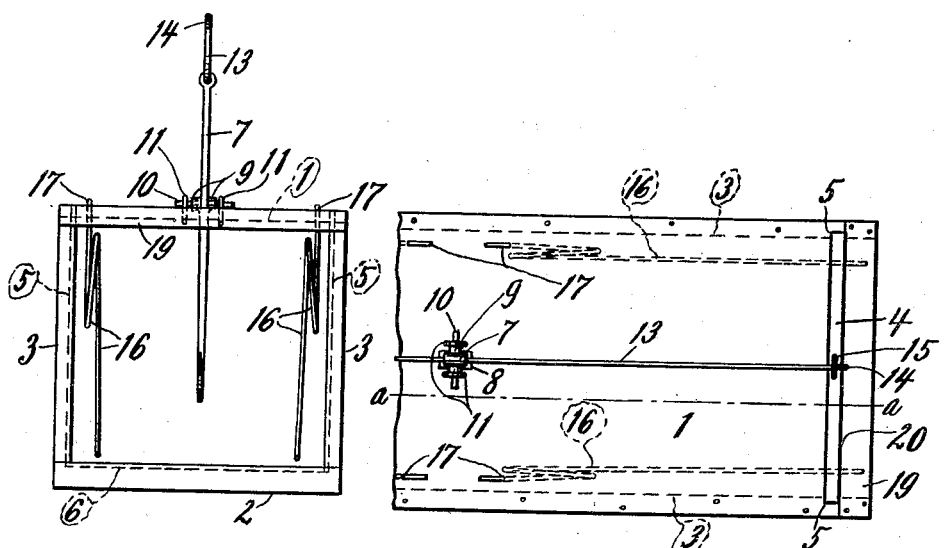
FIG. 2.
FIG. 3.
WITNESSES:
D. E. Carlsen.
W. M. Carlsen.
INVENTOR:
Charles Olson
BY HIS ATTORNEY:
A. M. Carlsen.
THE NORRIS PETERS CO., WASHINGTON, D. C.

UNITED STATES PATENT OFFICE.

CHARLES OLSON, OF HECTOR, MINNESOTA.

ANIMAL-TRAP.

No. 897,302.   Specification of Letters Patent.   Patented Sept. 1, 1908.

Application filed January 24, 1908. Serial No. 412,496.

*To all whom it may concern:*

Be it known that I, CHARLES OLSON, a citizen of the United States, residing at Hector, in the county of Renville and State of Minnesota, have invented a new and useful Animal-Trap, of which the following is a specification.

My invention relates to improvements in animal-traps; and has for its object the providing of a durable, efficient trap in which can be caught any kind of animal according to the size of the trap.

Figure 1 is a longitudinal, vertical section of my animal-trap about on the line $a$—$a$ in Fig. 3. Fig. 2 is an end view of the trap with the end door removed so as to more plainly see the inside parts. Fig. 3 is a top view of the trap showing all to the right of line $b$—$b$ in Fig. 1.

Referring to the drawing by reference numerals, 1, 2 and 3 represent respectively, the top, bottom and sides of an elongated box which comprises the main or body portion of the trap and may be made of wood with metal lining, or wood or metal alone.

Near each end of the box are two vertically movable doors 4, $4^a$ adapted to slide up and down in the grooves 5, in the sides 3, and when the doors are in the closed position they rest in the grooves 6 in the bottom.

At or near the center of the box cover is an aperture through which is suspended from a pivot 10 held upon the cover by two staples 11, a normally vertically disposed bar 7, of which the lower end is formed into a bait hook $7^a$ holding a bait 12 near the bottom of the box. The upper end of said bar 7 extends for some distance above the box cover and has affixed in it a bar 13, forming two opposite arms, whose partly downward curved ends 14 engage staples 15, or other apertures, in the upper ends of the vertically slidable doors 4 and $4^a$, which doors are thereby held open and elevated until either one of the two arms be withdrawn, when the other arm will swing downward with the other door whether it disengages it or not, and thus the two doors are free to be closed as soon as one arm is disengaged. Such disengagement takes place whenever an animal enters the trap and by either pushing or pulling on the bait removes one of the arms from one of the doors, as indicated in dotted lines $13^\times$, $14^\times$ and $15^\times$ in Fig. 1. When the doors are thus set free, they may fall down by their own weight, but to insure their quick and firm closing they are each engaged by two spring arms 16, each of which has one end inserted upward through the top of the box and bent down as at 17, or secured in any suitable manner, and the other end projecting through a hole 18 near the bottom end of the door. Thus it will be seen that with two springs near each side wall running to doors in the opposite ends of the box, there will be two spring-ends projecting through each door near the lower corners of same, whereby the doors are firmly closed and held closed and with their lower ends down in the groove 6, so that the animal can not raise the door and escape under it.

19 are bars fixed across the top of each end of the box and serving to prevent bending of the door outward when made of thin sheet iron or tin, as may the whole box be made of.

From the above description it will be seen that my trap is a simple, effective trap for catching animals alive, as is often desirable for various purposes.

When the traps are made of wood, it is best to line them with metal, to prevent animals of the rodent species from gnawing the wood and escaping.

Having thus described my invention, what I claim is:—

1. In an animal trap, in combination, an elongated box open at both ends and having a top with a central aperture and transverse slots near its end, vertically slidable doors in said slots to close the ends of the box, springs secured to the box and engaging the doors to close them, a bait hook pivotally suspended within the box near the middle of the cover and extending above the cover through said aperture therein, two arms extending from said upward extension and adapted to engage each of them one of the doors to hold them elevated, and to trip them when the bait hook is moved.

2. In an animal trap, in combination, an elongated box open at both ends and having a top with a central aperture and transverse slots near its end, vertically slidable doors in said slots to close the ends of the box, springs secured to the box and engaging the doors to close them, a bait hook pivotally suspended within the box near the middle of the cover and extending above the cover through said aperture therein, two arms extending from said upward extension and adapted to engage each of them one of the doors to hold them elevated, and to trip them when the bait is moved, said box having in its sides grooves guiding the doors.

3. In an animal trap, in combination, an elongated box open at both ends and having a top with a central aperture and transverse slots near its end, vertically slidable doors in said slots to close the ends of the box, springs secured to the box and engaging the doors to close them, a bait hook pivotally suspended within the box near the middle of the cover and extending above the cover through said aperture therein, two arms extending from said upward extension and adapted to engage each of them one of the doors to hold them elevated, and to trip them when the bait hook is moved, said box having in its sides grooves guiding the doors and grooves in its bottom for the lower ends of the doors for the purpose set forth.

4. In an animal trap, in combination, an elongated box open at both ends and having a top with a central aperture and transverse slots near its end, vertically slidable doors in said slots to close the ends of the box, springs secured to the box and engaging the doors to close them, a bait hook pivotally suspended within the box near the middle of the cover and extending above the cover through said aperture therein, two arms extending from said upward extension and adapted to engage each of them one of the doors to hold them elevated, and to trip them when the bait hook is moved, said doors having apertures and said springs being situated inside the box near the sides thereof, and having each an arm engaged in one of the apertures in the door near each side of the box.

5. In an animal trap, in combination, an elongated box open at both ends and having a top with a central aperture and transverse slots near its end, vertically slidable doors in said slots to close the ends of the box, springs secured to the box and engaging the doors to close them, a bait hook pivotally suspended within the box near the middle of the cover and extending above the cover through said aperture therein, two arms extending from said upward extension and adapted to engage each of them one of the doors to hold them elevated, and to trip them when the bait hook is moved, said doors having each in its upper end means for the arm to engage, and said arms being curved or arched downwardly at their ends to facilitate their disengagement when the bait-hook is touched by the animal.

In testimony whereof I affix my signature, in presence of two witnesses.

CHARLES OLSON.

Witnesses:
S. WARDEESON,
P. L. SCHMITZ.